United States Patent
Kashiwagi

(10) Patent No.: US 11,937,003 B2
(45) Date of Patent: Mar. 19, 2024

(54) SOLID-STATE IMAGE SENSOR AND SOLID-STATE IMAGE SENSOR DRIVING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Minoru Kashiwagi, Chigasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 87 days.

(21) Appl. No.: 17/463,424

(22) Filed: Aug. 31, 2021

(65) Prior Publication Data

US 2022/0295006 A1    Sep. 15, 2022

(30) Foreign Application Priority Data

Mar. 10, 2021    (JP) .................................. 2021-038316

(51) Int. Cl.
*H04N 25/71*    (2023.01)
*H04N 25/60*    (2023.01)
*H04N 25/711*   (2023.01)

(52) U.S. Cl.
CPC ........... *H04N 25/745* (2023.01); *H04N 25/60* (2023.01); *H04N 25/711* (2023.01)

(58) Field of Classification Search
CPC .... H04N 25/745; H04N 25/60; H04N 25/711; H04N 25/701
See application file for complete search history.

(56) References Cited

U.S. PATENT DOCUMENTS

| 5,920,063 | A | * | 7/1999 | Kawamoto | .......... | H04N 1/1912 250/208.1 |
| 7,053,941 | B1 | * | 5/2006 | Ohashi | ................... | H04N 1/407 348/251 |
| 7,667,757 | B2 | | 2/2010 | Ikeda | | |
| 7,898,586 | B2 | | 3/2011 | Kashiwagi | | |

(Continued)

FOREIGN PATENT DOCUMENTS

| JP | H088701 A | 1/1996 |
| JP | 2003152952 A | 5/2003 |

(Continued)

OTHER PUBLICATIONS

Japanese Office Action dated Dec. 26, 2023, mailed in counterpart Japanese Application No. 2021-038316, 10 pages (with translation).

*Primary Examiner* — Sinh Tran
*Assistant Examiner* — Zhenzhen Wu
(74) *Attorney, Agent, or Firm* — Kim & Stewart LLP

(57) ABSTRACT

According to one embodiment, a solid-state image sensor includes a linear array of pixels, a timing generator that outputs a pulse signal, a plurality of clock drivers that generate each generate a different drive signal based on the pulse signal, an analog shift register that transfers the signal charges in one direction along the linear array by applying the drive signals to the respective transfer blocks. The plurality of drive signals generated by the plurality of clock drivers each have a different phase.

5 Claims, 12 Drawing Sheets

(56) References Cited

U.S. PATENT DOCUMENTS

| | | |
|---|---|---|
| 2002/0060595 A1 | 5/2002 | Nakano |
| 2003/0123106 A1 | 7/2003 | Sawada |
| 2007/0285518 A1* | 12/2007 | Ikeda .................... H04N 25/713 |
| | | 348/207.99 |
| 2008/0198252 A1* | 8/2008 | Kashiwagi ........... H04N 25/745 |
| | | 348/E5.091 |
| 2012/0017107 A1* | 1/2012 | Lee ..................... G06F 13/4072 |
| | | 713/400 |
| 2016/0353045 A1 | 12/2016 | Kawahito |
| 2020/0059621 A1* | 2/2020 | Kobayashi ........... H04N 25/701 |
| 2020/0219452 A1* | 7/2020 | Xiao .................... G09G 3/3266 |
| 2022/0286640 A1* | 9/2022 | Cowley ................ H04N 25/745 |

FOREIGN PATENT DOCUMENTS

| | | |
|---|---|---|
| JP | 3620440 B2 | 2/2005 |
| JP | 2007311555 A | 11/2007 |
| JP | 2008199507 A | 8/2008 |
| JP | 2009130799 A | 6/2009 |
| JP | 2012074803 A | 4/2012 |
| WO | 2015119243 A1 | 8/2015 |

* cited by examiner

SOLID-STATE IMAGE SENSOR AND SOLID-STATE IMAGE SENSOR DRIVING METHOD

CROSS-REFERENCE TO RELATED APPLICATION

This application is based upon and claims the benefit of priority from Japanese Patent Application No. 2021-038316, filed Mar. 10, 2021, the entire contents of which are incorporated herein by reference.

FIELD

Embodiments described herein relate generally to a solid-state image sensor and a driving method of a solid-state image sensor.

BACKGROUND

There is a solid-state image sensor that comprises a linear image sensor in which a plurality of pixels are arrayed in a row or line. The linear image sensor is used in image readers such as copiers, facsimile machines, and image scanners.

The solid-state image sensor performs photoelectric conversion of light incident on pixels to generate signal charges from the pixels according to the light received. These generated signal charges are transferred by an analog shift register configured as, for example, a charge coupled device (CCD), and are output as an analog output signal from the analog shift register at value corresponding to the signal charge amount. The output signal from the solid-state image sensor is converted into a digital signal by a signal processing integrated circuit (IC) such as analog front end (AFE) provided in the image reader.

The analog shift register is driven by a drive signal generated by a clock driver based on a pulse signal generated by a timing generator. To reduce the cost of the image reader and to make it easier to assemble, the timing generator and the clock driver may be built into the solid-state image sensor, which is configured as a semiconductor chip.

The analog shift register has a large number of electrodes for driving the CCD. The CCD elements change a potential when the corresponding electrodes change potential between a high level and a low level, and transfers the signal charges based on the alternation in applied potential. The amount of current supplied to the electrodes decreases when the potential is kept at the high level or at the low level, and increases when the potential transitions from the high level to the low level or from the low level to the high level. Therefore, the total amount of current supplied from the clock driver to all the electrodes of the analog shift register fluctuates greatly during operations. Therefore, in a configuration in which the clock driver is integrated with the solid-state image sensor, noise may be generated in the output signal due to the current fluctuations in the clock driver during the driving of CCD array.

The output signal has a noisy (high noise) period in which various noises are superimposed on the output signal and a flat (low noise) period in which noise is not substantially superimposed on the output signal. It would be desirable that for the signal processing IC to perform its signal processing (such as A/D conversion) during the flat period. However, when the current fluctuation of the clock driver is large, the flat period does not have the length required for the signal processing IC to perform the processing. Particularly, when increasing the frequency of the pulse signal generated by the timing generator in order to operate the solid-state image sensor at a high speed, the flat period becomes shorter. As a result, the signal processing IC will generally also have to use the output signal from the high noise period for processing, and the A/D conversion may be performed on a noisy (possibly incorrect) original signal value to produce a digital value that does not match the underlying original signal value, and as a result, the image quality may deteriorate.

DETAILED DESCRIPTION

Embodiments provide a solid-state image sensor and a method of driving a solid-state image sensor that can reduce deterioration of the waveform of output signal even if the clock drivers for driving an analog shift register are integrated into the same chip with the image sensor.

In general, according to one embodiment, a solid-state image sensor includes a linear array of pixels that perform photoelectric conversion on incident light to generate and accumulate signal charges; a timing generator that outputs one or more pulse signals; a plurality of clock drivers that each generate a drive signal based on a pulse signal output from the timing generator; and an analog shift register that includes a plurality of transfer blocks corresponding to the plurality of pixels. The analog shift register transfers the signal charges along one direction of the linear array by applying the plurality of drive signals to the plurality of transfer blocks, respectively. The drive signals generated by the plurality of clock drivers each have different phases.

Hereinafter, certain example embodiments will be described with reference to the drawings.

First Embodiment

Configuration

Figure 1:
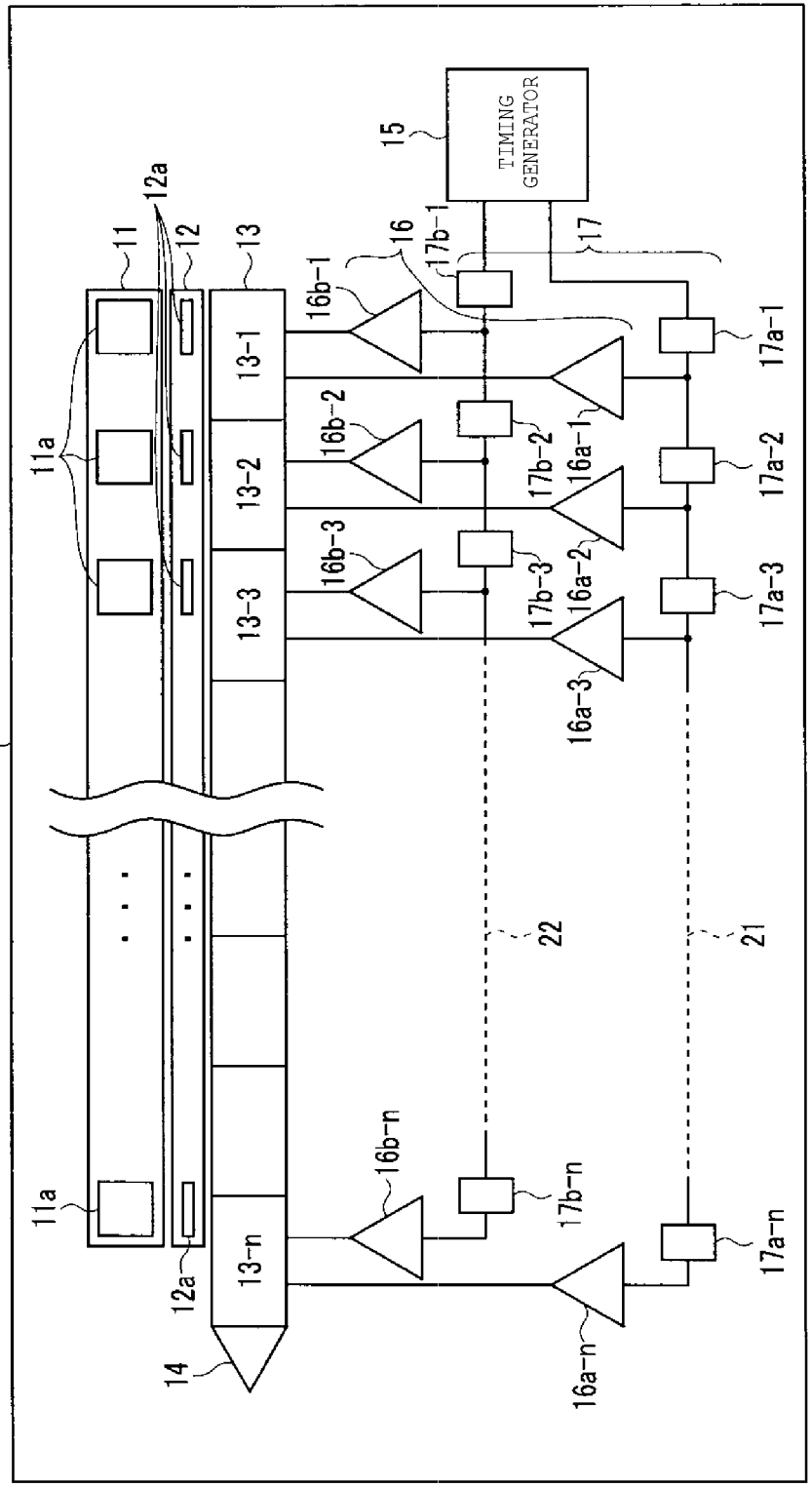
FIG. 1 is a diagram showing a schematic configuration of a solid-state image sensor according to a first embodiment.

FIG. 1 is a diagram showing a schematic configuration of a solid-state image sensor according to the first embodiment.

The solid-state image sensor 1 is, for example, a linear image sensor on a single semiconductor substrate 18 (refer to FIG. 2), and includes a pixel unit 11, a shift gate 12, an analog shift register 13, an output unit 14, a timing generator 15, a clock driver 16, and a delay element 17.

In the pixel unit 11, a plurality of pixels 11a that generate and accumulate signal charges by performing a photoelectric conversion on incident light are linearly arrayed.

The shift gate 12 transfers the signal charges from the pixel unit 11 to the analog shift register 13. The shift gate 12 includes a plurality of shift gate electrodes 12a corresponding to the plurality of pixels 11a, and transfers the signal charges accumulated in the plurality of pixels 11a to a plurality of transfer blocks 13-1 to 13-n of the analog shift register 13 respectively by applying a voltage to each of the plurality of shift gate electrodes 12a. Here, n is a positive integer. By controlling a timing of applying a voltage to the shift gate electrode 12a after each pixel 11a of the pixel unit 11 starts the accumulation of the signal charges, the accumulation time of the signal charges by the pixel 11a can be controlled.

The analog shift register 13 includes a plurality of transfer blocks 13-1 to 13-n corresponding to the plurality of pixels 11a, and transfers the respective signal charges received from the pixel unit 11 via the shift gate 12 in one direction by applying a plurality of drive signals to each of the plurality of transfer blocks 13-1 to 13-n.

The output unit 14 is provided at an end portion of the analog shift register 13 at one end, and converts the signal charges transferred by the analog shift register 13 into an analog output signal OS (refer to FIG. 3) according to a signal charge amount. Specifically, the output unit 14 is provided at a portion adjacent to the transfer block 13-n (the last transfer block in the row of transfer blocks 13-1 to 13-n). Therefore, the transfer block 13-1 (the first transfer block in the row of transfer blocks 13-1 to 13-n) is located on the upstream side and the transfer block 13-n is positioned on a downstream side in the direction along which the signal charges are transferred for output. The analog output signal OS converted by the output unit 14 is output from the solid-state image sensor 1, and is then A/D (analog-to-digital) converted by, for example, a signal processing circuit provided outside the solid-state image sensor 1. Digital signal processing can be performed on the resulting digital signal.

The timing generator 15 outputs a pulse signal.

A plurality of clock drivers 16 are provided, and these generate a plurality of drive signals for driving the analog shift register 13. Each drive signal is based on the pulse signal output from the timing generator 15. In the first embodiment, the analog shift register 13 is configured to be driven by a first drive signal CK1 and a second drive signal CK2. A clock driver 16a-i for applying the first drive signal CK1-i and a clock driver 16b-i for applying a second drive signal CK2-i are respectively provided in each of the transfer blocks 13-i, where i=1 to n.

Figure 2:
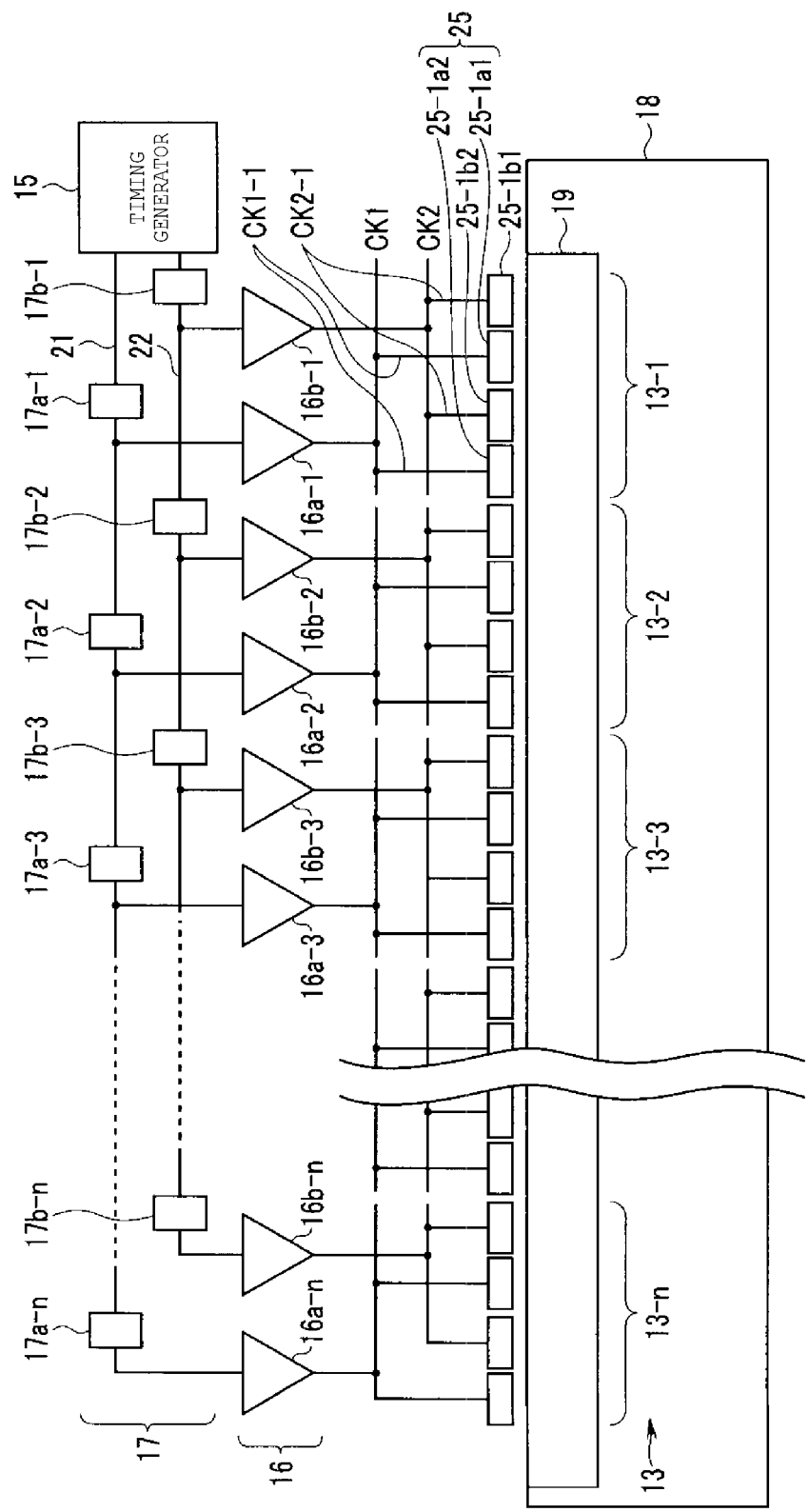
FIG. 2 is a schematic cross-sectional view of an analog shift register of a solid-state image sensor according to a first embodiment.

FIG. 2 is a schematic cross-sectional view of the analog shift register 13 of the solid-state image sensor 1 according to the first embodiment.

A channel 19 is formed near the surface of the semiconductor substrate 18. A plurality of transfer gate electrodes 25 are formed on the channel 19 via an insulator layer (not specifically depicted). In the example in FIG. 2, four transfer gate electrodes 25 are formed for each transfer block 13-i. Specifically, the transfer gate electrodes 25-ia1, 25-ia2, 25-ib1, and 25-ib2 are formed for the transfer block 13-i (in order to avoid complicating the drawings, an example of code i=1 is shown in FIG. 2). Of these four transfer gate electrodes 25, a clock driver 16a-i is connected to the transfer gate electrodes 25-ia1 and 25-ia2 and the first drive signal CK1-i is supplied, a clock driver 16b-i is connected to the transfer gate electrodes 25-ib1 and 25-ib2 and the second drive signal CK2-i is supplied.

As shown in FIG. 2, output signal lines of the clock driver 16a-i and output signal lines of the clock driver 16a-(i+1) are separated and are not connected to each other, and output signal lines of the clock driver 16b-i and output signal lines of the clock driver 16b-(i+1) are separated and are not connected to each other. Therefore, the drive signals CK1-j and CK2-j having the numbers "j" different from the particular number "i" of the transfer block 13-i are not supplied to the transfer block 13-i.

Figure 3:
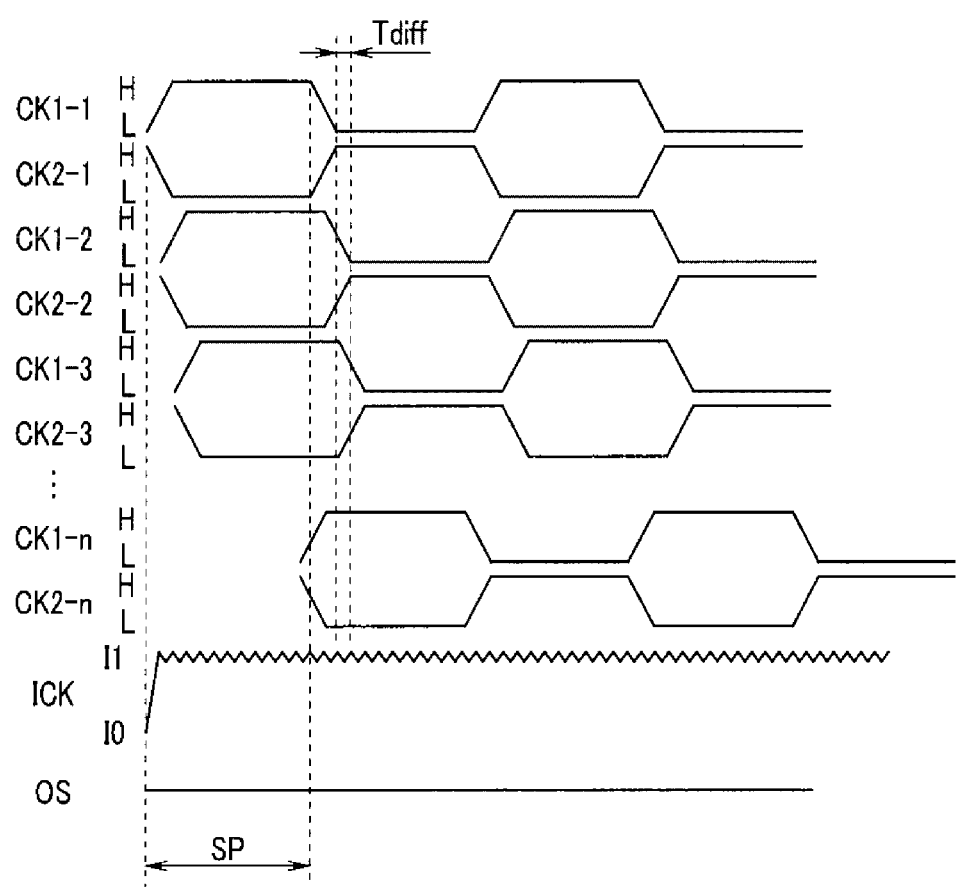
FIG. 3 is a timing chart showing a driving operation of an analog shift register of a solid-state image sensor according to first through fifth embodiments.

FIG. 3 is a timing chart showing a driving operation of the analog shift register 13 of the solid-state image sensors 1 to the first embodiment and also the solid-state image sensors 1A, 1B, 1C, 1D according second to fifth embodiments described below.

The first drive signal CK1-i and the second drive signal CK2-i are pulse signals that each alternately repeat a high level (H) and a low level (L). The first drive signal CK1-i and the second drive signal CK2-i are, for example, signals having opposite phases. In this case, when the first drive signal CK1-i is high level (H), the second drive signal CK2-i is low level (L), and when the first drive signal CK1-i is low level (L), the second drive signal CK2-i is high level (H).

By changing the high level (H) and the low level (L) of the drive signals CK1-i and CK2-i, the potential of the channel region under each transfer gate electrode 25-ia1, 25-ia2, 25-ib1, and 25-ib2 changes, and thus, for example, electrons which are carriers of the signal charges are sequentially transferred to the adjacent channel regions along one direction.

The delay element 17 adjusts the phase of the pulse signal by delaying the pulse signal output from the timing generator 15 by as much as a delay time Tdiff (refer to FIG. 3). The delay element 17 includes a plurality of delay elements 17a-1 to 17a-n and a plurality of delay elements 17b-1 to 17b-n. The delay element 17 is, for example, an element that delays the signal by a combination of electric resistance and electric capacitance. However, other configurations may be adopted as the delay element 17.

In the first embodiment, the clock driver 16a-i is connected to the timing generator 15 via a signal line 21, and the clock driver 16b-i is connected to the timing generator 15 via a signal line 22. The timing generator 15 outputs the pulse signal to the signal lines 21 and 22, respectively. Furthermore, in the first embodiment, the plurality of clock drivers 16a-i (i=1 to n) are each connected to the signal line 21 in parallel with each other but for the delay elements 17a-i, and the plurality of clock drivers 16b-i (i=1 to n) are connected to the signal line 22 in parallel with each other but for the delay elements 17b-i.

The first delay element 17a-1 is arranged between a branch node toward the clock driver 16a-1 from the signal line 21 and the timing generator 15. Other delay elements 17a-i (i=2 to n) are arranged between the branch node toward the clock driver 16a-(i−1) from the signal line 21 and the branch node toward the clock driver 16a-i from the signal line 21. That is, the plurality of delay elements 17a-1 to 17a-n are connected on the signal line 21 so as to be in series with each other from the timing generator 15.

Similarly, the first delay element 17b-1 is arranged between the branch node toward the clock driver 16b-1 from the signal line 22 and the timing generator 15. Other delay elements 17b-i (i=2 to n) are arranged between the branch node toward the clock driver 16b-(i−1) from the signal line 22 and the branch node toward the clock driver 16b-i from the signal line 22. That is, the plurality of delay elements 17b-1 to 17b-n are connected on the signal line 22 so as to be in series with each other from the timing generator 15.

With this configuration, the clock driver 16a-i generates a drive signal CK1-i based on a pulse signal whose phase is altered by the delay elements 17a-1 to 17a-i. In addition, the clock driver 16b-i generates a drive signal CK2-i based on the pulse signal whose phase is altered by the delay elements 17b-1 to 17b-i. Therefore, the number of delay elements 17 arranged between the timing generator 15 differs according to whether the particular value i (i=1 to n) of the clock driver 16a-i, and the particular value i (i=1 to n) of the clock driver 16b-i. By adopting this configuration, the drive signal CK1-i has a different phase for each of value of i=1 to n, and the drive signal CK2-i has a different phase for each of value of i=1 to n.

Here, assuming that one pixel signal period shown in FIG. 3 is the time increment SP ("SP"), it is preferable that each of the delay elements 17a-1 to 17a-i has a configuration by which the pulse signal is delayed by time increment SP/n and that each of the delay elements 17b-1 to 17b-i has a configuration by which the pulse signal is delayed by time increment SP/n. In this case, the drive signal CK1-(i+1) is delayed by time increment SP/n from the drive signal CK1-i, and the drive signal CK2-(i+1) is delayed by time increment SP/n from the drive signal CK2-i. That is, a value of phase difference (delay time Tdiff) of the two drive signals CK1 and CK2 supplied to the two adjacent transfer blocks 13-i and 13-(i+1) is equal to time increment SP/n.

As a result, the timing at which the high level (H) and the low level (L) of the drive signal CK1-i are switched is delayed by time increment SP/n as i changes to i=1, 2, . . . n. In addition, the timing at which the high level (H) and the low level (L) of the drive signal CK2-i are switched is delayed by time increment SP/n as i changes to i=1, 2, . . . n. Therefore, as shown in FIG. 3, a peak of a total value ICK of the current of the drive signals CK1-1 to CK1-n and the drive signals CK2-1 to CK2-n is evenly distributed over time, and the variation with time becomes smaller than would otherwise be the case.

The current value ICK equal to the current flowing through all the clock drivers 16 rises to a value of approximately current level I1 (current peak value I1) in this example when the entire analog shift register 13 is driven while assuming that the value is I0 before driving. However, since the peaks of the value of the current of each clock driver 16a-i and 16b-i are shifted, the current fluctuates in the vicinity of current level I1 (current peak value I1) with only a small amplitude, and thus, a large current fluctuation does not occur.

Figure 8:
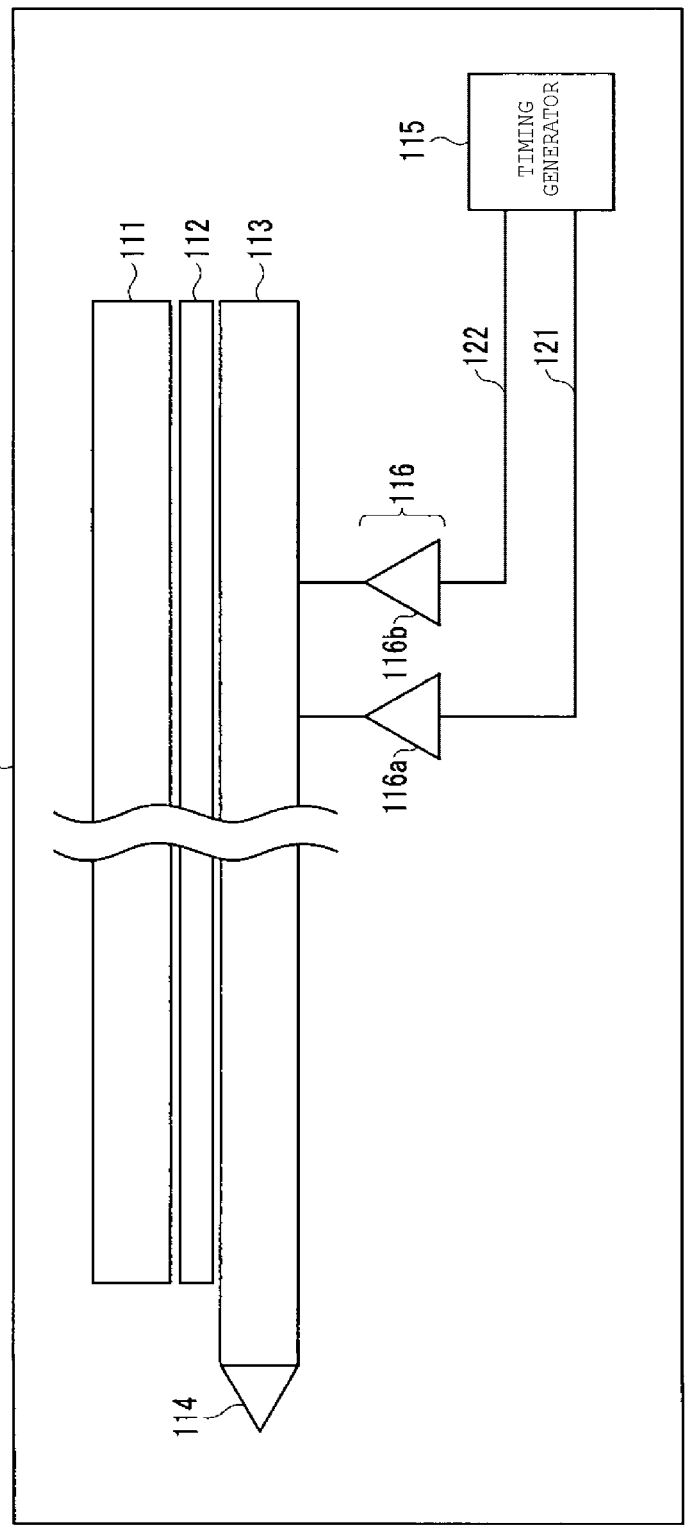
FIG. 8 is a diagram showing a schematic configuration of a solid-state image sensor according to a first comparison example.
Figure 9:
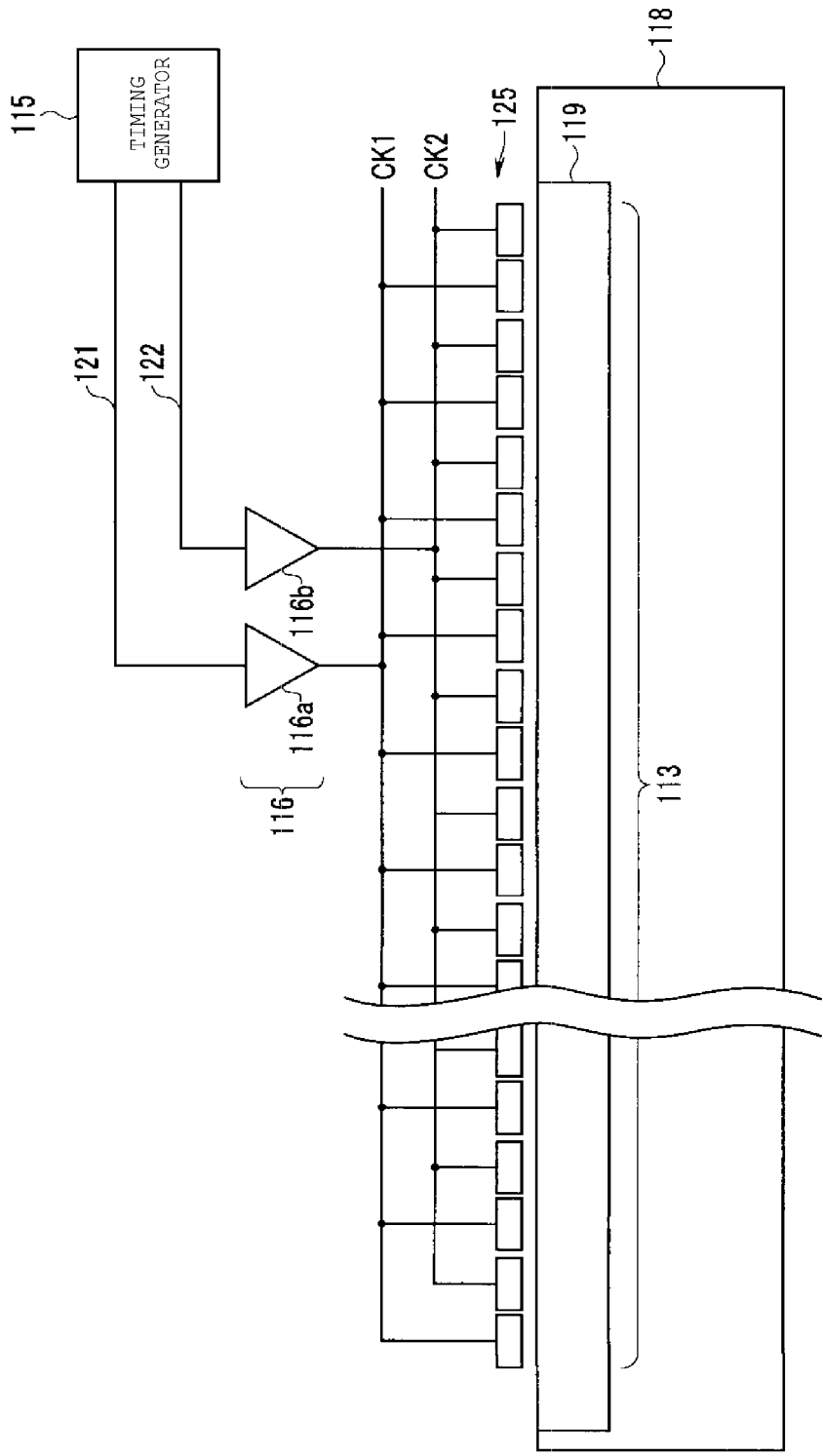
FIG. 9 is a schematic cross-sectional view of an analog shift register of the solid-state image sensor according to the first comparison example.
Figure 10:
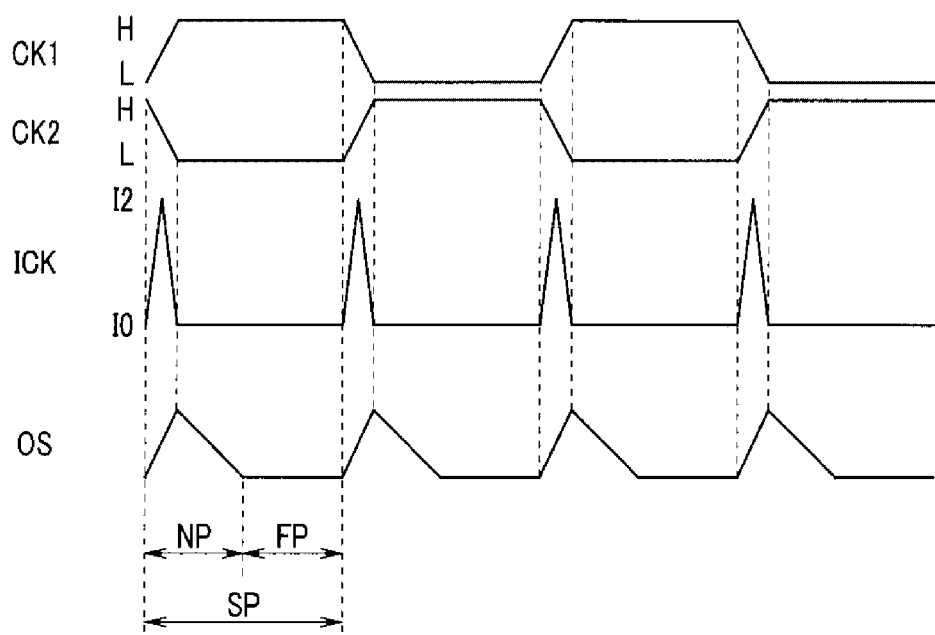
FIG. 10 is a timing chart showing a driving operation of the analog shift register of the solid-state image sensor according to the first comparison example and also a second comparison example.

FIG. 8 is a diagram showing a schematic configuration of a solid-state image sensor 101 according to a first comparison example. FIG. 9 is a schematic cross-sectional view of an analog shift register 113 of the solid-state image sensor 101 according to the first comparison example. FIG. 10 is a timing chart showing the driving operation of the analog shift register 113 of the solid-state image sensor 101 of the first comparison example and also a solid-state image sensor 101A according to a second comparison example.

As shown in FIG. 8, the solid-state image sensor 101 of the first comparison example is a linear image sensor configured on the semiconductor substrate 118 (refer to FIG. 9), and includes a pixel unit 111, a shift gate 112, an analog shift register 113, an output unit 114, a timing generator 115, and a clock driver 116.

Similarly to the first embodiment, a plurality of pixels are arrayed in the pixel unit 111, the shift gate 112 transfers the signal charges from the pixel unit 111 to the analog shift register 113, the analog shift register 113 transfers the signal charges in one direction, and the timing generator 115 outputs a pulse signal.

As shown in FIG. 9, the analog shift register 113 includes a channel 119 formed on the semiconductor substrate 118 and a plurality of transfer gate electrodes 125 formed on the channel 119 via an insulator layer.

The clock driver 116 in the first comparison example includes a clock driver 116a connected to the timing generator 115 via a signal line 121 and a clock driver 116b connected to the timing generator 115 via a signal line 122. The clock driver 116a generates a first drive signal CK1 based on the pulse signal output from the timing generator 115. The clock driver 116b generates a second drive signal CK2 based on the pulse signal output from the timing generator 115.

As shown in FIG. 9, the first drive signal CK1 is applied to all of the even-numbered transfer gate electrodes 125 among the plurality of transfer gate electrodes 125. The second drive signal CK2 is applied to all of the odd-numbered transfer gate electrodes 125 among the plurality of transfer gate electrodes 125.

Therefore, the first and second drive signals CK1 and CK2, which are generated by the two clock drivers 116a and 116b, together drive all the transfer gate electrodes 125 provided in the analog shift register 113 at the same time (simultaneously).

Therefore, when driving all the analog shift registers 113, the current value ICK of the current flowing through all the clock drivers 116, which was current level I0 before driving, suddenly rises to a current peak value I2 (see FIG. 10) at the timing when the high level (H) and low level (L) of the first drive signal CK1 and the second drive signal CK2 are switched. Here, when comparing the current peak value I2 in the first comparison example with the current peak value I1 in the first embodiment, current peak value I2>>current peak value I1.

In addition, once the high level (H) and the low level (L) of the first drive signal CK1 and the second drive signal CK2 are set (stable), the current value ICK hardly fluctuates off current level I0.

The current value ICK changes significantly with the time from current level I0 to current peak value I2 and this causes noise for the output signal OS through effects on the power supply, grounding lines, and the like. Here, in the time increment SP (corresponding to one pixel signal period) during which the signal charges of a pixel are transferred, there is a period (a high noise period NP) during which the noise is generated in the output signal OS, and a period (a flat period FP) during which the noise is not significantly generated. As shown in FIG. 10, when the noise period NP occurs in the output signal OS from the output unit 114, the flat period FP in the one pixel signal period SP becomes shorter.

Particularly, when operating the solid-state image sensor 101 at a high speed with a high number of clock cycles, the time increment SP becomes short, but the length of the noise period NP is constant even if the number of clock cycles is changed, thus the flat period FP becomes shorter by the same amount as the decrease in the time increment SP caused by the use of the higher clock signal frequency.

Signal processing, such as A/D conversion, is performed on the analog output signal OS output from the output unit 114 by a signal processing circuit provided outside the solid-state image sensor 101. When the flat period FP is not long enough for the signal processing circuit to perform the necessary/desired signal processing, the signal processing must also be performed on the output signal OS output during the noise period NP, and thus, the signal processing is performed on a noisy (fluctuating) original signal value which may not reflect the actual value. As a result, the image quality may deteriorate.

Figure 11:
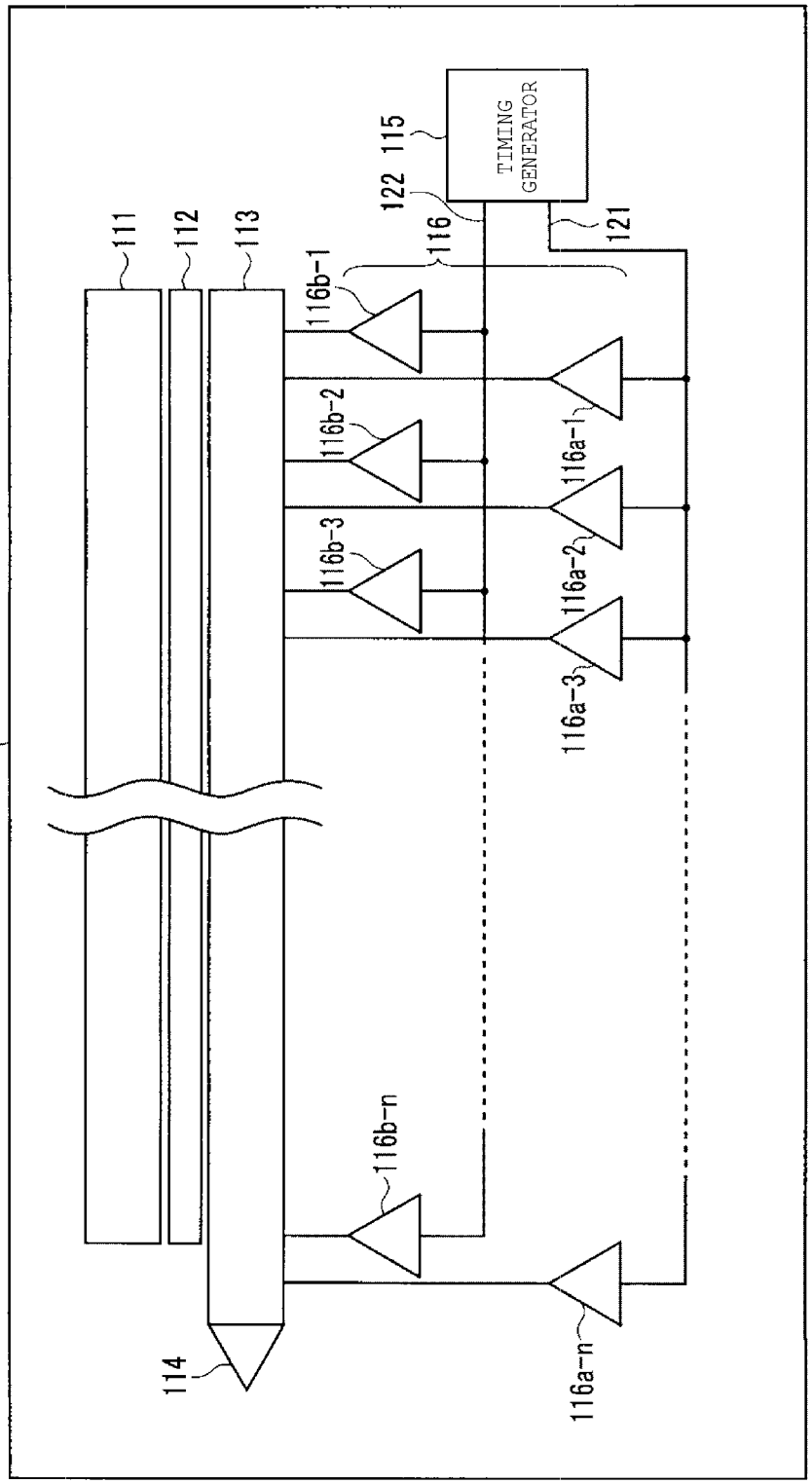
FIG. 11 is a diagram showing a schematic configuration of the solid-state image sensor according to the second comparison example.
Figure 12:
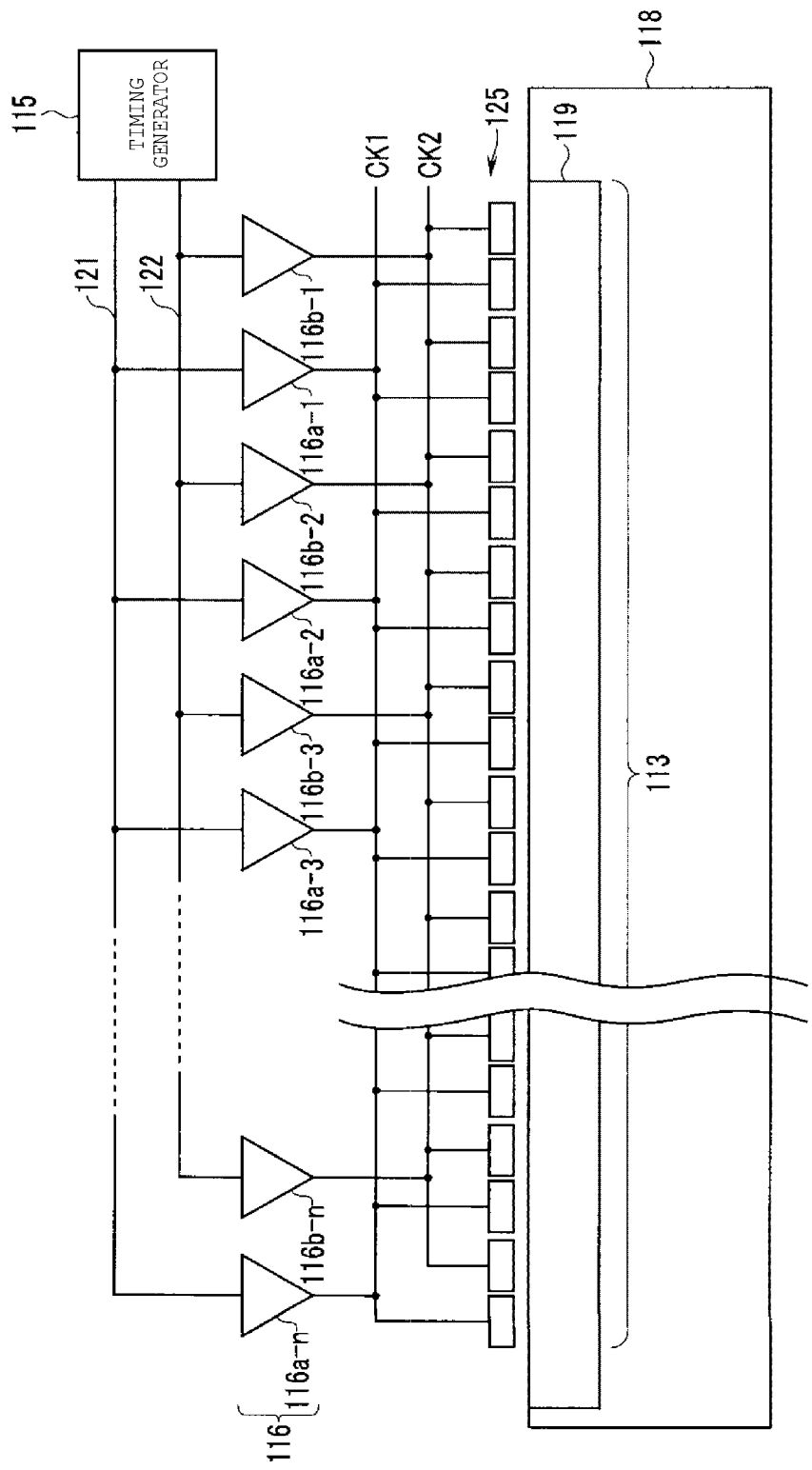
FIG. 12 is a schematic cross-sectional view of an analog shift register of the solid-state image sensor according to the second comparison example.

In addition, FIG. 11 is a diagram showing a schematic configuration of a solid-state image sensor 101A according to a second comparison example. FIG. 12 is a schematic cross-sectional view of an analog shift register 113 of the solid-state image sensor 101A according to the second comparison example.

In the clock driver 116 in the second comparison example, a plurality of clock drivers 116a-1 to 116a-n are connected in parallel with each other via a signal line 121 to the timing generator 115, and a plurality of clock drivers 116b-1 to 116b-n are connected in parallel with each other via a signal line 122 to the timing generator 115.

Therefore, similarly to the first comparison example, since the current value of each clock driver 116a-i or 116b-i is small, but all the clock drivers 116a-1 to 116a-n generate the first drive signal CK1 at the same time and all the clock drivers 116b-1 to 116b-n generate the second drive signal CK2 at the same time, the current value ICK for the current flowing through all the clock drivers 116 rises to approximately the current peak value I2 when driving the entire analog shift register 113.

Therefore, even with the configuration in the second comparison example, as shown in FIG. 10, the flat period FP becomes short, and the signal processing may be performed on a noisy value different from the original (actual) signal value.

On the other hand, according to the first embodiment, as shown in FIG. 3, by distributing the drive timing of the clock driver 16, the peak of the current value ICK is reduced to current peak value I1, which is smaller than current peak value I2, and the fluctuation of the current value ICK over time is reduced. Therefore, the noise period NP basically does not occur in the output signal OS from the output unit 14, and almost all of the time increment SP (one pixel signal period) becomes the flat period FP. Therefore, in the solid-state image sensor 1 with the built-in clock driver 16 that drives the analog shift register 13, the deterioration of the waveform of the output signal OS can be reduced. As a result, the signal processing circuit provided outside the solid-state image sensor 1 can obtain a digital signal value in accordance with the original signal value of the output signal OS, and can prevent the deterioration of the image quality. In addition, since the external signal processing circuit can use almost all of the time increment SP for signal processing (including the A/D conversion processing) the signal processing can be performed with an extra margin of time.

In addition, since the timing generator 15 and the clock driver 16 are built in the solid-state image sensor 1, it is not necessary to provide a timing generator and a clock driver outside of the solid-state image sensor 1, and thus, the size and cost of the image reader in which the solid-state image sensor 1 is incorporated can be reduced.

Furthermore, since the deterioration of the waveform of the output signal OS is reduced by the solid-state image sensor 1 itself, it is not necessary to additional incorporate components to the solid-state image sensor 1 for reducing noise caused by the drive signal output from the clock driver 16 in, and thus, the size and cost of the solid-state image sensor 1 itself can be reduced.

Second Embodiment

Figure 4:
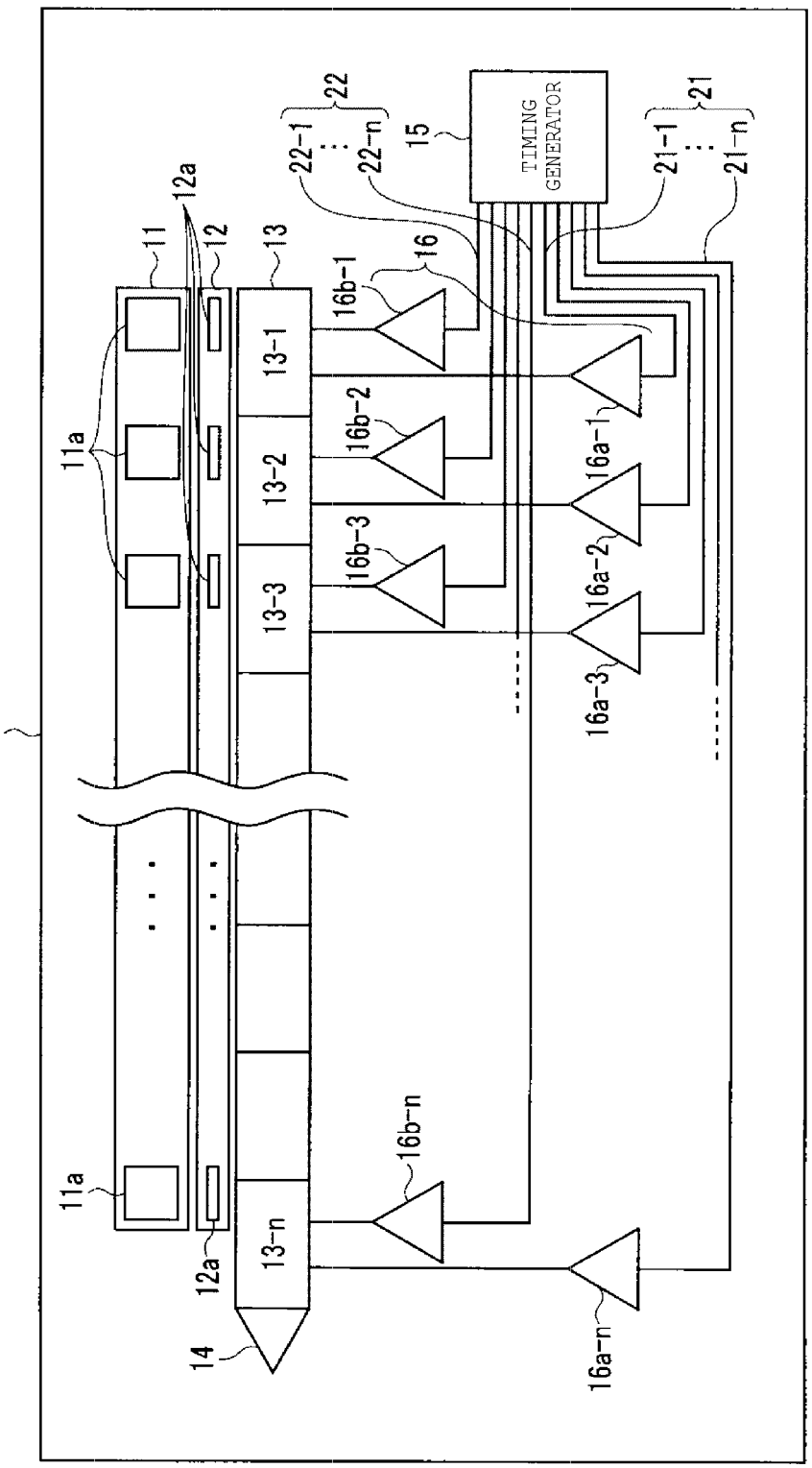
FIG. 4 is a diagram showing a schematic configuration of a solid-state image sensor according to a second embodiment.

FIG. 4 is a diagram showing a schematic configuration of a solid-state image sensor 1A according to the second embodiment. In a second embodiment, the same reference numerals will be given to the same portion as in the first embodiment, and the description thereof will be omitted and the differences are primarily described.

In the first embodiment, a plurality of clock drivers 16a-1 to 16a-n are connected to the signal line 21, and a plurality of clock drivers 16b-1 to 16b-n are connected to the signal line 22. On the other hand, in the second embodiment, the plurality of clock drivers 16a-1 to 16a-n are individually connected to the timing generator 15 via a plurality of signal lines 21-1 to 21-n, and the plurality of clock drivers 16b-1 to 16b-n are individually connected to the timing generator 15 via signal lines 22-1 to 22-n.

The timing generator 15 outputs pulse signals having different phases to the signal lines 21-1 to 21-n, and likewise outputs the pulse signals having different phases to the signal lines 22-1 to 22-n.

It is preferable that the phase of the pulse signal output to the signal line 21-(i+1) is delayed from the phase of the pulse signal output to the signal line 21-i by time increment SP/n. Similarly, it is preferable that the phase of the pulse signal output to the signal line 22-(i+1) is delayed from the phase of the pulse signal output to the signal line 22-i by time increment SP/n.

As a result, each of the clock drivers 16a-1 to 16a-n generates the drive signals CK1-1 to CK1-n (as shown in FIG. 3), and each of the clock drivers 16b-1 to 16b-n generates the drive signals CK2-1 to CK2-n (as shown in FIG. 3) to drive the transfer blocks 13-1 to 13-n. Therefore, the current value ICK and the waveform of the output signal OS flowing through all the clock drivers 16 are the same as those in FIG. 3.

According to the second embodiment, by connecting the timing generator 15 and the plurality of clock drivers 16 by separate signal lines, and by making the phases of the pulse signals output from the timing generator 15 to the plurality of clock drivers 16 be different from each other, substantially the same effect as the first embodiment described above can be achieved.

Third Embodiment

Figure 5:
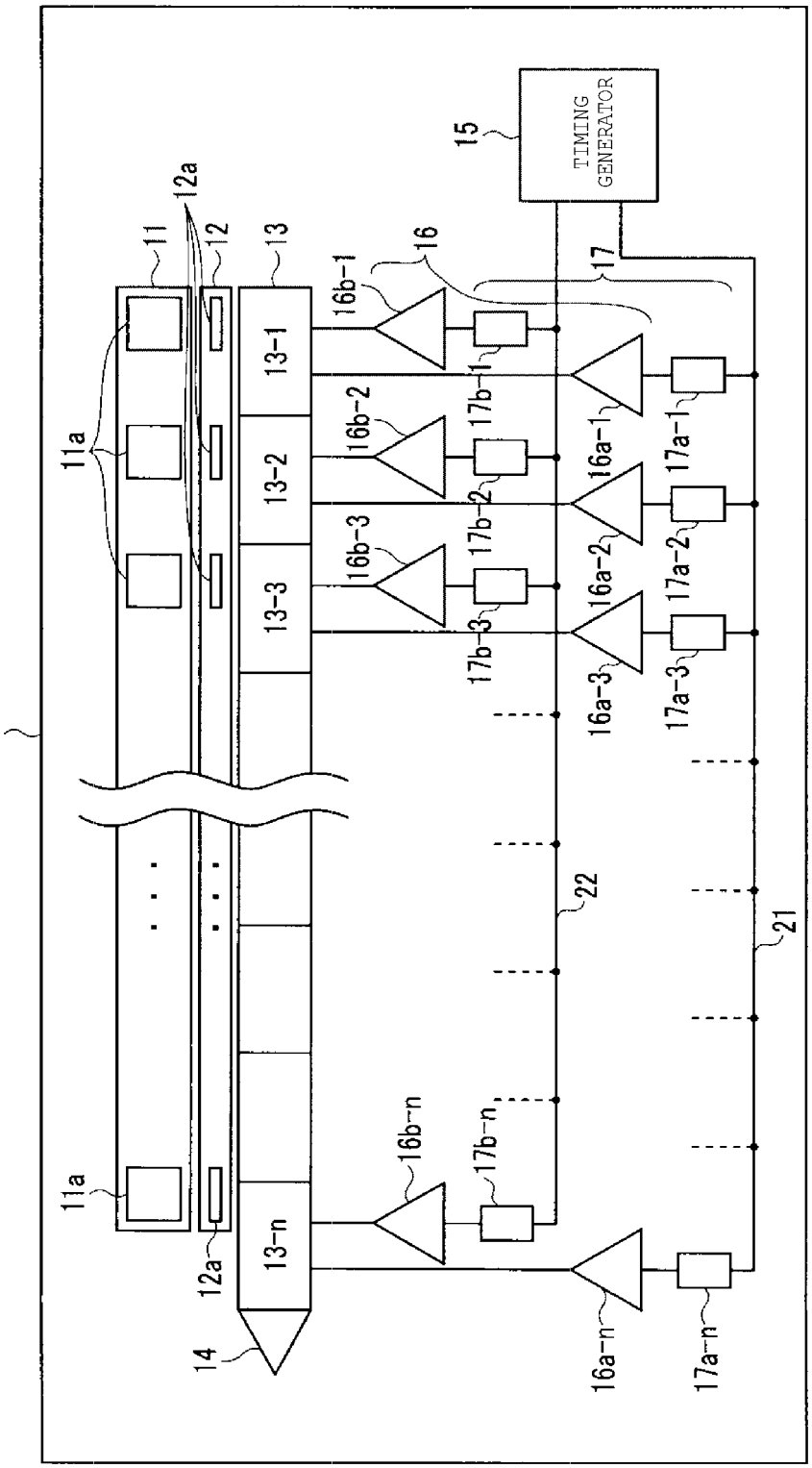
FIG. 5 is a diagram showing a schematic configuration of a solid-state image sensor according to a third embodiment.

FIG. 5 is a diagram showing a schematic configuration of a solid-state image sensor 1B according to the third embodiment. In a third embodiment, the same reference numerals will be given to the same portion as in the first and second embodiments, and the description thereof will be omitted and the differences are primarily described.

In the third embodiment, the plurality of clock drivers 16a-i (i=1 to n) are connected in series with the plurality of delay elements 17a-i (i=1 to n), respectively, between the signal line and the corresponding transfer block 13-*i*. Similarly, plurality of clock drivers 16*b*-*i* (i=1 to n) are connected in series with the plurality of delay elements 17*b*-*i* (i=1 to n), respectively, between the signal line 22 and the corresponding transfer block 13-*i*.

If the clock driver 16*a*-*i* and the delay element 17*a*-*i* connected in series are assumed to be one set (unit), n units are connected in parallel with each other via the signal line 21 to the timing generator 15. Similarly, if the clock driver 16*b*-*i* and the delay element 17*b*-*i* connected in series are assumed to be one set (unit), n units are connected in parallel with each other via the signal line 22 to the timing generator 15.

In this embodiment, the delay amounts of the delay elements 17*a*-1 to 17*a*-*n* are different from each other, and the delay amounts of the delay elements 17*b*-1 to 17*b*-*n* are also different from each other. It is preferable that the delay amounts of the delay element 17*a*-*i* and the delay element 17*b*-*i* be equal to (i×time increment SP/n).

As a result, each of the clock drivers 16*a*-1 to 16*a*-*n* generates the drive signals CK1-1 to CK1-*n* (as shown in FIG. 3), and each of the clock drivers 16*b*-1 to 16*b*-*n* generates the drive signals CK2-1 to CK2-*n* (as shown in FIG. 3), to drive the transfer blocks 13-1 to 13-*n*. Therefore, the current value ICK of the current and the waveform of the output signal OS flowing through all the clock drivers 16 are the same as those in FIG. 3.

According to the third embodiment, even if n units of clock drivers 16*a*-*i* and delay element 17*a*-*i* connected in series are provided and connected in parallel to the timing generator 15, and n units of clock drivers 16*b*-*i* and delay elements 17*b*-*i* connected in series and connected in parallel to the timing generator 15 substantially the same effect as the first and second embodiments described above can be obtained by making the delay amounts of different delay elements 17 be different amounts.

Fourth Embodiment

Figure 6:
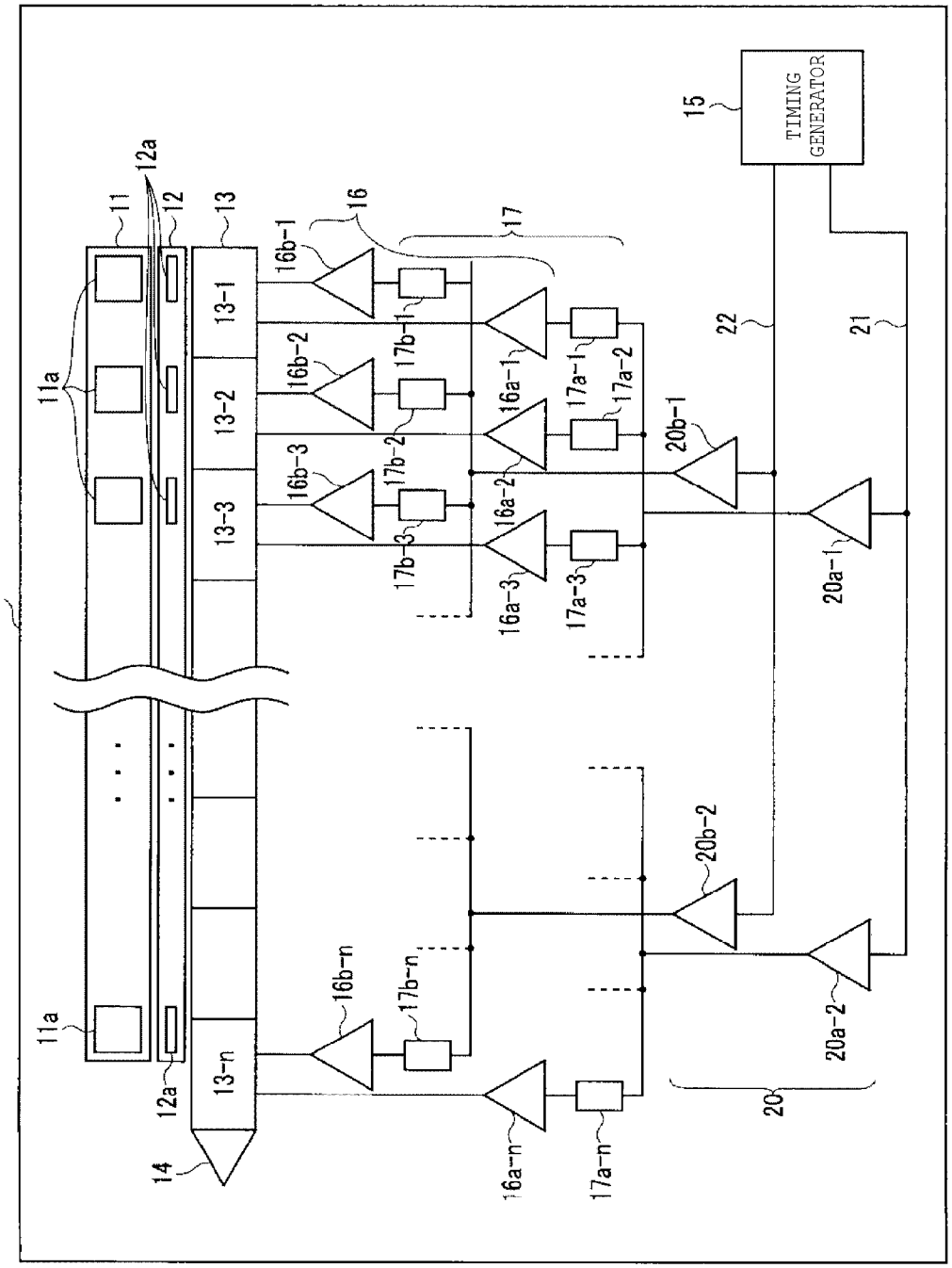
FIG. 6 is a diagram showing a schematic configuration of a solid-state image sensor according to a fourth embodiment.

FIG. 6 is a diagram showing a schematic configuration of a solid-state image sensor 1C according to the fourth embodiment. In a fourth embodiment, the same reference numerals will be given to the same portion as in the first to third embodiments, and the description thereof will be omitted and the differences are primarily described.

The solid-state image sensor 1C in the fourth embodiment has a configuration in which one or more repeaters 20 that amplify the pulse signal are provided in order to compensate for the attenuation and delay of the pulse signal output from the timing generator 15 that would otherwise occur such as in the solid-state image sensor 1B shown in FIG. 5.

The solid-state image sensor 1C in which a plurality of pixels 11*a* are arrayed in one direction in the pixel unit 11 has a length in one direction which is longer than a length in the direction orthogonal to one direction. Therefore, when transmitting the pulse signal generated from the timing generator 15 in one direction, in some cases, the attenuation and delay (phase shift) of the pulse signal due to the wiring length (wiring resistance, parasitic capacitance, or the like) cannot be ignored. Furthermore, when the delay element 17 is an element that delays the signal due to a combination of the electric resistance and the electric capacitance as described above, the pulse signal is attenuated by the load of the delay element(s) 17. In addition, the load of the clock driver 16 also causes the pulse signal to be attenuated and a phase shift to occur. Therefore, the repeater 20 is provided to compensate for such attenuation and delay of the pulse signal.

In the example shown in FIG. 6, the repeater 20 comprises two repeaters 20*a*-1 and 20*a*-2 that are connected to the signal line 21 in parallel, and two repeaters 20*b*-1 and 20*b*-2 that are connected to the signal line 22 in parallel.

Several sets (units) of a clock driver 16*a*-*i* and a delay element 17*a*-*i* are connected to the repeater 20*a*-1 in parallel, and other sets (units) of a clock driver 16*a*-*i* and a delay element 17*a*-*i* are connected to the repeater 20*a*-2 in parallel. For example, when n is an even number and n units are equally arranged for two repeaters 20*a*-1 and 20*a*-2, the sets of i=1 to (n/2) are connected to the repeater 20*a*-1 and the sets of i={(n/2)+1} to n are connected to the repeater 20*a*-2.

Similarly, several sets (units) of clock driver 16*b*-*i* and delay element 17*b*-*i* are connected to the repeater 20*b*-1 in parallel, and other sets (units) of clock driver 16*b*-*i* and delay element 17*b*-*i* are connected to the repeater 20*b*-2 in parallel. For example, when n is an even number and n sets are equally arranged for two repeaters 20*b*-1 and 20*b*-2, the sets of i=1 to (n/2) are connected to the repeater 20*b*-1 and the sets of i={(n/2)+1} to n are connected to the repeater 20*b*-2.

For example, as shown in FIG. 6, when the timing generator 15 is provided at the end portion at the upstream side in one direction along which the signal charges are transferred, a distance from the timing generator 15 to the repeater 20*a*-2 is farther than a distance from the timing generator 15 to the repeater 20*a*-1, and a distance from the timing generator 15 to the repeater 20*b*-2 is farther than a distance from the timing generator 15 to the repeater 20*b*-1. Therefore, in consideration of a difference in the attenuation rate of the pulse signal in accordance with the different distances, amplification rates of the repeater 20*a*-2 and the repeater 20*a*-1 may be different, and the amplification rates of the repeater 20*b*-2 and the repeater 20*b*-1 may likewise be different.

After that, the plurality of delay elements 17 delay the pulse signals as divided by the repeater 20 by different delay amounts to adjust the phase in the same as the third embodiment.

In the fourth embodiment, an example of adding the repeater 20 to the configuration in the third embodiment was described, but the present disclosure not limited to this, and a repeater 20 may also be added to the configurations of the first to third and the fifth embodiments.

As an example, when adding the repeater 20 to the configuration in the second embodiment shown in FIG. 4, one or more repeaters 20 that relay the pulse signal output from the timing generator 15 may be provided between the timing generator 15 and the plurality of clock drivers 16. Specifically, a repeater 20 may be provided in or for each of the signal lines 21-1 to 21-*n* and the signal lines 22-1 to 22-*n*.

According to the fourth embodiment, an effect substantially the same as that in the third embodiment can be achieved, and since a repeater 20 is provided, the phase shift of the pulse signal output from the timing generator 15 due to the wiring length (wiring resistance, parasitic capacitance, or the like) and the phase shift due to the load of the clock driver 16 and the like can be compensated.

Fifth Embodiment

Figure 7:
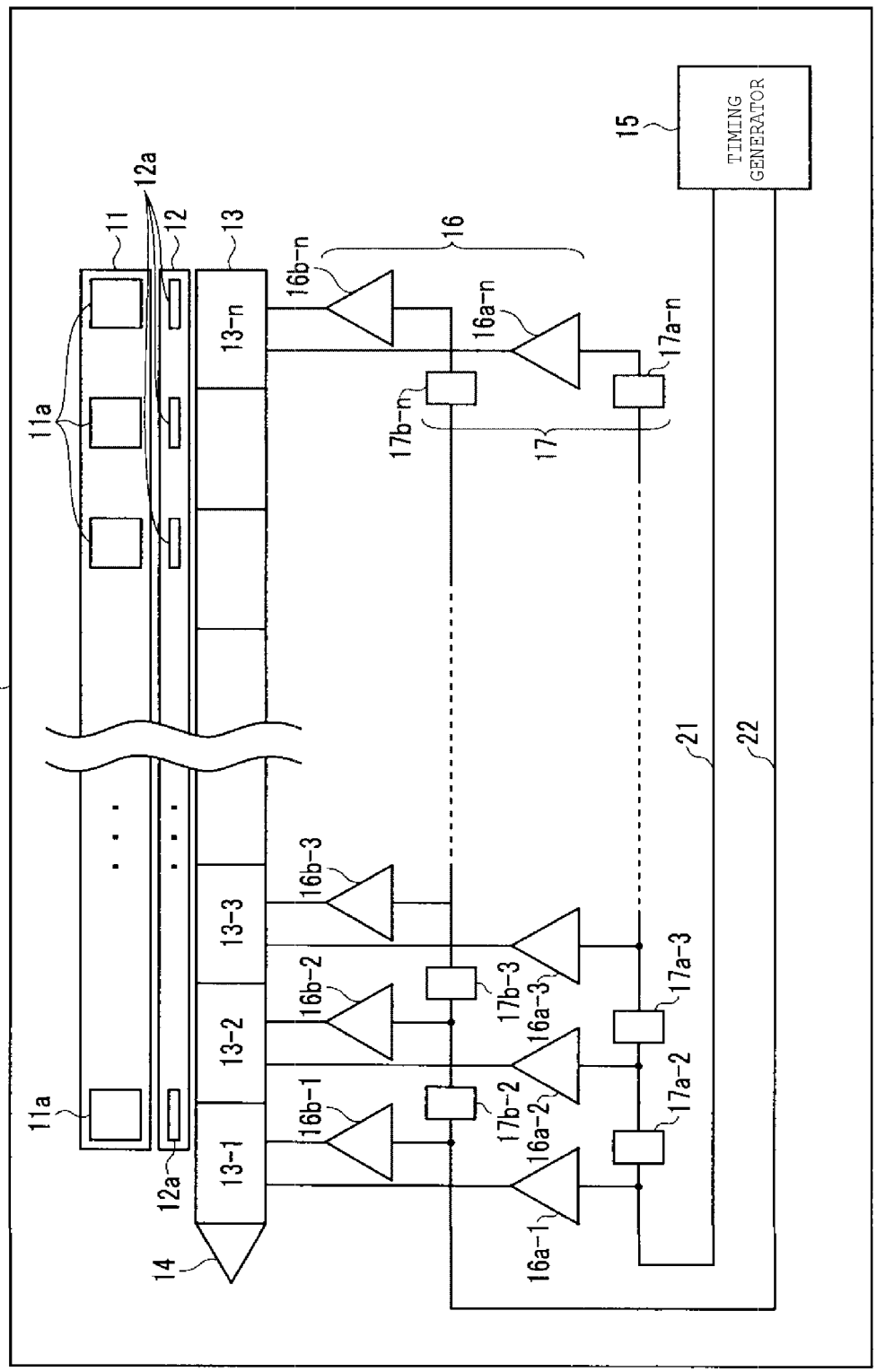
FIG. 7 is a diagram showing a schematic configuration of a solid-state image sensor according to a fifth embodiment.

FIG. 7 is a diagram showing a schematic configuration of a solid-state image sensor 1D according to the fifth embodiment. In the fifth embodiment, the same reference numerals will be given to the same portion as in the first to fourth embodiments, and the description thereof will be omitted and the differences are primarily described.

In the firth embodiment, among the plurality of transfer blocks 13-1 to 13-n of the analog shift register 13, the transfer block 13-n is positioned at the upstream side and the transfer block 13-1 is positioned at the downstream side along the direction in which the signal charges are transferred. Therefore, the output unit 14 is provided at the portion adjacent to the transfer block 13-1.

A plurality of clock drivers 16a-i (i=1 to n) are connected in parallel with each other via the signal line 21 to the timing generator 15, and a plurality of clock drivers 16b-i (i=1 to n) are connected in parallel with each other via the signal line 22 to the timing generator 15. Here, the clock drivers 16a-1 and 16b-1 are arranged at the upstream side of the pulse signal output from the timing generator 15, and the clock drivers 16a-n and 16b-n are arranged at the downstream side. The clock drivers 16a-i and 16b-i are connected to the transfer block 13-i.

The delay element 17a-i is arranged between the branch node to the clock driver 16a-(i−1) and the branch node to the clock driver 16a-i on the signal line 21 (i=2 to n). The delay element 17b-i is arranged between the branch node to the clock driver 16b-(i−1) and the branch node to the clock driver 16b-i on the signal line 22 (i=2 to n).

In the fifth embodiment, the delay element 17a-1 between the branch node to the clock driver 16a-1 and the timing generator 15 on the signal line 21 and the delay element 17b-1 between branch node to the clock driver 16b-1 and the timing generator 15 on the signal line 22, are omitted. Since the phases of n clock drivers 16 can be made different from each other by use of (n−1) delay elements 17, the configuration in which the delay elements 17a-1 and 17b-1 are omitted may be used for other embodiments.

In addition, in the configuration example shown in FIG. 7, since the timing generator 15 is disposed on the right side of the solid-state image sensor 1D, the wiring lengths of the signal line 21 and the signal line 22 are long. Therefore, if possible in the configuration of solid-state image sensor 1D, the timing generator 15 may be disposed on the left side of the solid-state image sensor 1D to shorten the wiring lengths of the signal line 21 and the signal line 22.

In the configuration in the first embodiment, the operation timing is sequentially delayed from the transfer block 13-1 at the upstream side toward the transfer block 13-n at the downstream side, but in the configuration in the fifth embodiment, the operation timing is sequentially delayed from the transfer block 13-1 at the downstream side toward the transfer block 13-n at the upstream side.

According to the fifth embodiment, substantially the same effect as in the first embodiment described above can be achieved.

In addition, in the first to fourth embodiments, the first output signal OS from the output unit 14 is the signal charges transferred from the pixel 11a to the transfer block 13-n, and the delay amount of the drive signals CK1-n and CK2-n applied to the transfer block 13-n is time increment SP/n, for example. On the other hand, in the present embodiment, the first output signal OS from output unit 14 is the signal charge transferred from pixel 11a to transfer block 13-1, and the delay amount of the drive signals CK1-1 and CK2-1 applied to the transfer block 13-1 is zero, for example. Therefore, in the fifth embodiment, the output of the output signal OS from the output unit 14 can be started earlier than in the first embodiment.

In addition, since the delay elements 17a-1 and 17b-1 are omitted, the output of the output signal OS can be started earlier and the configuration can be made simpler.

In some of the example embodiments described above, the delay element 17 are explicitly provided (depicted), but the present disclosure is not limited to this, the delay effect due to the parasitic capacitance and the parasitic resistance of the connective wiring itself may be used as an equivalent of a delay element 17 or a substitute for a delay element.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A solid-state image sensor, comprising:
a linear array of pixels configured to perform photoelectric conversion of incident light to generate and accumulate signal charges corresponding to the incident light;
an analog shift register that includes a plurality of transfer blocks respectively corresponding to the pixels, the analog shift register configured to transfer the accumulated signal charges received from the linear array of pixels along one direction parallel to the linear array, each transfer block having a first clock driver connected to a first electrode and a second clock driver connected to a second electrode;
a timing generator configured to output pulse signals;
a first signal line connecting the timing generator to the first clock drivers and receiving a first pulse signal from the timing generator; and
a second signal line connecting the timing generator to the second clock drivers and receiving a second pulse signal from the timing generator, the second pulse signal having an opposite phase from the first pulse signal, wherein
each transfer block is driven by its respective first and second clock drivers with a driving signal that has a phase that is offset from the driving signal of any other transfer block in the plurality of transfer blocks.

2. The solid-state image sensor according to claim 1, wherein the offset is a multiple of a period of each driving signal divided by the total number of transfer blocks in the plurality of transfer blocks.

3. The solid-state image sensor according to claim 1, further comprising:
a plurality of delay elements, each having substantially the same delay amount, wherein
delay elements are connected in series along the first and second signal lines,
the first clock drivers are connected to different points along the first signal line such that the first pulse signal received by each first clock driver passes through a different number of delay elements, and
the second clock drivers are connected to different points along the second signal line such that the second pulse signal received by each second clock driver passes through a different number of delay elements.

4. The solid-state image sensor according to claim 1, further comprising:

a plurality of first delay elements, each first delay element being connected in series with a first clock driver of one of the plurality of transfer blocks between the first signal line and the respective one of the plurality of transfer blocks; and a plurality of second delay elements, each second delay element being connected in series with a second clock driver of one of the plurality of transfer blocks between the second signal line and the respective one of the plurality of transfer blocks, wherein each of the first delay elements has a different delay amount, and each of the second delay elements has a different delay amount.

5. The solid-state image sensor according to claim 4, further comprising:

a first repeater between the timing generator and the first signal line, the first repeater configured to relay the first pulse signal output from the timing generator; and a second repeater between the timing generator and the second signal line, the second repeater configured to relay the second pulse signal output from the timing generator.

\* \* \* \* \*